(12) United States Patent
Wang et al.

(10) Patent No.: US 6,687,563 B1
(45) Date of Patent: Feb. 3, 2004

(54) INTEGRATION METHOD OF DISPATCH AND SCHEDULE TOOLS FOR 300 MM FULL AUTOMATION FAB

(75) Inventors: Ming Wang, Junghe (TW); Jim Chue, Putz (TW); Ray Shih, Kaohsiung (TW); Eric Chang, Tainan (TW); Jason Liu, Yungkang (TW)

(73) Assignee: Taiwan Semiconductor Manufacturing Company, Hsin-chu (TW)

( * ) Notice: Subject to any disclaimer, the term of this patent is extended or adjusted under 35 U.S.C. 154(b) by 0 days.

(21) Appl. No.: 10/355,998

(22) Filed: Jan. 31, 2003

(51) Int. Cl.$^7$ .............................................. G06F 19/00
(52) U.S. Cl. ...................... 700/121; 700/100; 700/103; 705/8
(58) Field of Search .................. 700/121, 99, 100, 700/103, 95; 705/8; 709/103

(56) References Cited

U.S. PATENT DOCUMENTS

| | | | |
|---|---|---|---|
| 5,229,948 A | 7/1993 | Wei et al. ...................... 364/468 |
| 5,444,632 A | 8/1995 | Kline et al. ................... 364/468 |
| 5,446,671 A | 8/1995 | Weaver et al. ............... 364/468 |
| 5,546,326 A | 8/1996 | Tai et al. ....................... 364/552 |
| 5,548,518 A | 8/1996 | Dietrich et al. ......... 364/468.06 |
| 5,612,886 A | 3/1997 | Weng ...................... 364/468.07 |
| 5,623,413 A | 4/1997 | Matheson et al. ........... 364/436 |
| 5,751,580 A | 5/1998 | Chi ......................... 364/468.07 |
| 5,826,238 A | * 10/1998 | Chen et al. ..................... 700/95 |
| 5,880,960 A | 3/1999 | Lin et al. ............... 364/468.05 |
| 6,128,588 A | * 10/2000 | Chacon .......................... 703/6 |
| 6,341,240 B1 | * 1/2002 | Bermon et al. ................. 705/8 |
| 6,456,894 B1 | * 9/2002 | Nulman ....................... 700/121 |
| 6,564,113 B1 | * 5/2003 | Barto et al. .................... 700/99 |

* cited by examiner

Primary Examiner—Albert W. Paladini
(74) Attorney, Agent, or Firm—George O. Saile; Stephen B. Ackerman

(57) ABSTRACT

A method and system that creates a rule-based Operation Job Supervisor System (OJS) or decision engine to automate and control Fab production for the optimum movement of wafer boxes through the Fab. It is integrated with current manufacturing control systems and a cooperative model between the dispatching and scheduling functions. This easy-to-maintain system architecture makes use of a dynamic evaluation formula and sub-formula that can handle exception cases and consider wafer box physical position concurrently. Because the decision engine is rule based, rule can be revised without need for re-compiling and shutting down the system. New patterns are learned by the system automatically when variables and parameters in the formulas are revised.

34 Claims, 5 Drawing Sheets

INTEGRATION METHOD OF DISPATCH AND SCHEDULE TOOLS FOR 300 MM FULL AUTOMATION FAB

BACKGROUND OF THE INVENTION

1. Field of Invention

This invention relates generally to a system and method of planning, scheduling, and dispatching during wafer production in a Fab and, more particularly, to an automated decision engine that integrates short-term (dispatching) and long-term (scheduling) production plans for optimum dispatching and scheduling of wafer build throughout the wafer's movement in the Fab.

2. Description of Related Art

In semiconductor manufacturing Fabs costing billions of dollars efficient use of tools is essential to controlling costs and maximizing throughput of the product. During the building of wafers, the wafer box or Front Open Unified Pot (FOUP) travels from position to position to be placed into the next required tool for its next processing to take place. A Fab planner does long-term production planning and calculates an optimal path using a scheduling tool. Separately, a Fab supervisor planner is doing short-term production planning to balance and filter WIP (Work in Progress) with a dispatching tool to set up an optimal path based on what is actually happening currently on the Fab floor. Setting up different rule for different product areas is usually done using a dispatching tool. As the planning is done differently and at different times, the plans are frequently inconsistent with effort sometimes being duplicated. Integrating of the two plans can be very difficult. Furthermore, individual usage of different reports by both the planner and supervisor can result in conflict between reports, subjectiveness, and increased costs due to software efforts needed to create support for this.

Most of the dispatching system has many exception rules, making it inefficient and very difficult to maintain. Furthermore, most dispatching systems do not consider the current position of the FOUP, so the optimal decision cannot be reached on the next move to make in a dynamic Fab like the new 300 mm Fab. In the more complex 300 mm Fabs, an Automatic Machine Handling System (AMHS) must choose the FOUP to be transferred by the dispatch system. As the AMHS is not rule based, it is difficult to modify rules or easily set up rules for each equipment type.

An additional difficulty comes from the fact that the scheduling tool has a performance issue, making it difficult for the supervisor to get real-time data from it. The bottom line is that current full-automation systems such as the 300 mm Fab with an AMHS can optimize MES logical data but can not optimize stocker utilization or avoid traffic jams caused by the AMFHS system.

A new method and system is needed to resolve these problems and optimize the FOUP travel through the Fab. This invention solves these problems and provides additional benefits.

In U.S. Pat. No. 5,880,960 (Lin et al.) a method to improve WIP balance in the manufacturing line is discussed. In U.S. Pat. No. 5,751,580 (Chi) a fuzzy logic method and system for adjusting of priority rating of work is discussed. In U.S. Pat. No. 5,623,413 (Matheson et al.) a scheduling system and method for moving objects through a multipath system is discussed. In U.S. Pat. No. 5,612,886 (Weng) a method and system for the dynamic dispatching of work in progress is discussed. In U.S. Pat. No. 5,548,518 (Dietrich et al.) an allocation method for generating a production schedule is discussed. In U.S. Pat. No. 5,546,326 (Tai et al.) a dynamic dispatching method is discussed. In U.S. Pat. No. 5,446,671 (Weaver et al.) a look-ahead method for maintaining optimum queued quantities is discussed. In U.S. Pat. No. 5,444,632 (Kline et al.) an apparatus and method for controlling and scheduling processing machines is discussed. In U.S. Pat. No. 5,229,948 (Wei et al.) a method of optimizing a serial manufacturing system is discussed.

SUMMARY OF THE INVENTION

This invention's overall objective is to provide an integrated method and system for the automation of a semiconductor Fab for production decision support. More specifically, the objective is to provide for a software decision engine to supervise optimal throughput of product into processing equipment. It is also an objective that the decision engine be rule based and that it define and integrate with a cooperative model between dispatch and schedule functions. It is another objective to have other Fab systems also integrate with the decision engine to interact as a unified whole system.

Additionally, it is an objective to provide a decision evaluation formula to integrate the results of system analysis tools for production decision support. It is an objective to have a sub-formula of the decision evaluation formula to resolve dynamic constraint issues. It is also an objective for the method and system to provide for an automatic learning methodology.

These objectives are achieved by the method and system of this invention. The use of this method and system in a Fab system provides cost savings by efficient automation and by optimizing the throughput of product traveling from tool to tool. It reduces bottle necks and over and under supply to tools by allowing each tool equipment control program to help in the movement of product between tools.

BRIEF DESCRIPTION OF THE DRAWINGS

This invention will be described with reference to the accompanying drawings, wherein.

DETAILED DESCRIPTION OF THE PREFERRED EMBODIMENT

In complex semiconductor manufacturing Fabs today, optimum scheduling and dispatching for product as it is manufactured plays a key role in cost-effective production. If tools stand by idle or have too much work waiting for them, the cost of production goes up as the tools are not being used optimally. Complex automated software systems have been developed to aid tool usage. These automated systems were developed in piecemeal fashion as the need arose to control or aid specific areas of the manufacturing process.

Fab planners that have the responsibility to control all the tools in the Fab use a scheduling function for long-term planning to best get a Front Open Unified Pot (FOUP) or wafer box through the various tools needed to create wafers. Each FOUP is one of several in production at any given time, all vying concurrently for a limited number of tools. Supervisors do short-term planning using a dispatching function. The goal of both planner and supervisor is to keep all tools busy and at maximum production by getting the FOUP to the correct tool at the correct time following an optimum path. This current schedule and dispatch system for balancing and filtering of Work in Progress (WIP) is based on individual usage of reports. This has the disadvantages of conflict between reports (ex. One report shows the FOUP should go to equipment A, while another shows that equipment B is idle.), subjectivity, and the high maintenance costs due to the many programs needed to support it. This plus the many complexities that occur on the Fab floor make it difficult to have consistency between scheduling and dispatching and to verify if consistency is not achieved. Effort is sometimes being duplicated and much maintenance is required. An automated method and system to integrate both is needed to achieve optimum WIP balance and the most wafers per hour.

Figure 1:
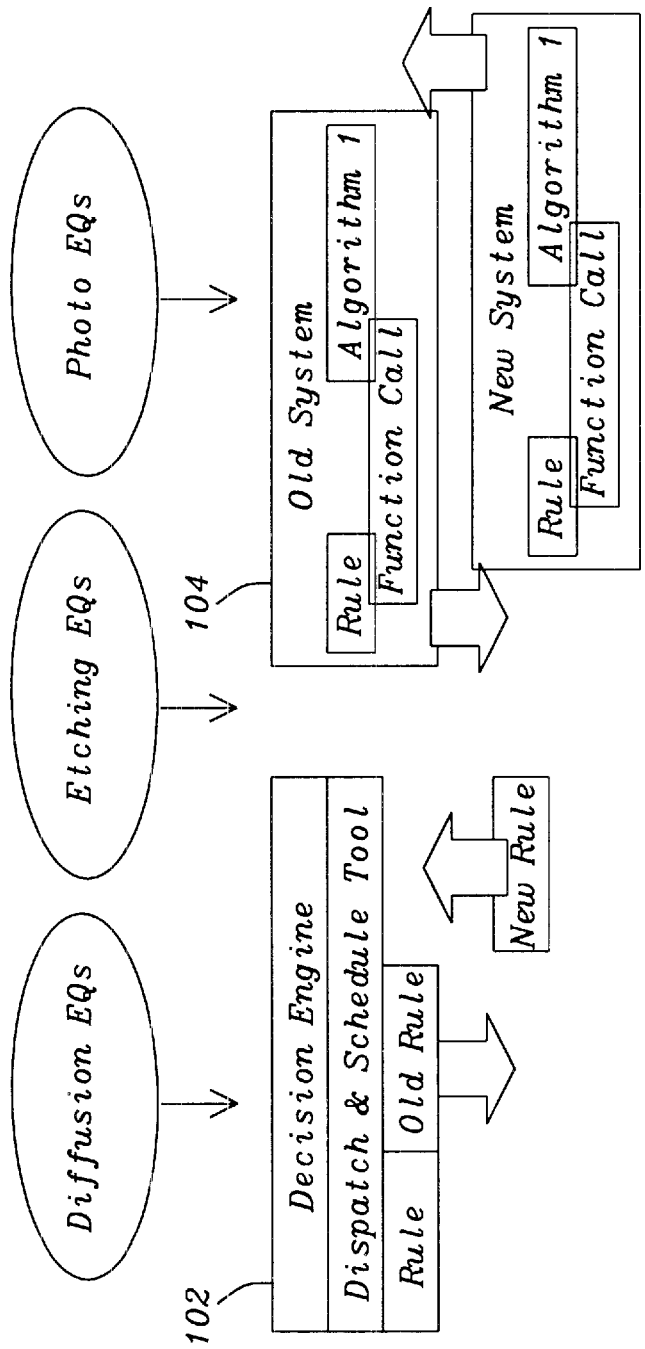
FIG. 1 is an illustration diagram comparing the new decision engine and prior art general system.

In FIG. 1 an illustration diagram compares the prior art general system with the new decision engine and reveals that under the prior art general system 104 rule revision necessitates recompiling and temporary system shut down. A new method and system such as the decision engine model 102 is needed to prevent system shut down for rule revision.

Figure 2:
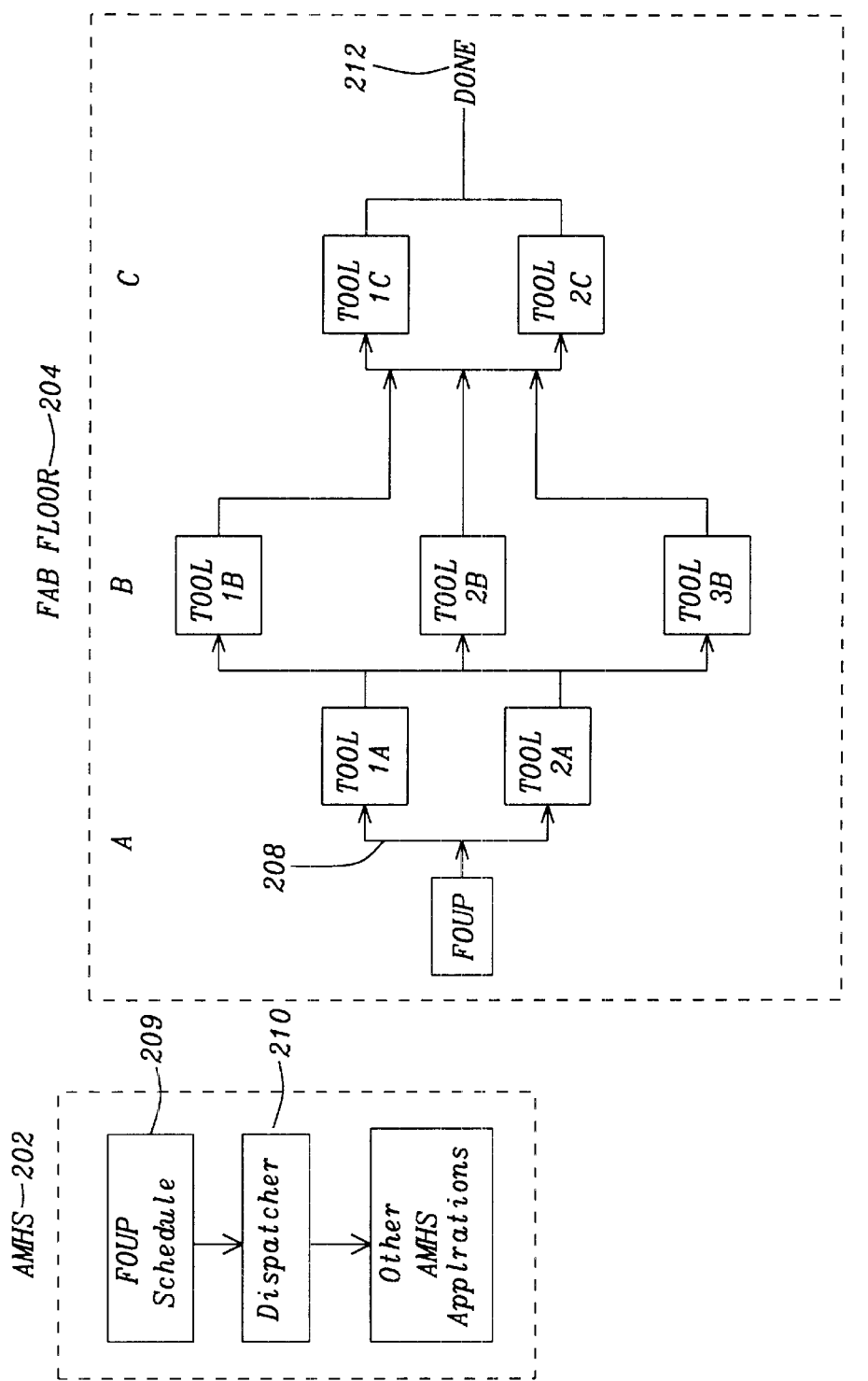
FIG. 2 is a flow diagram of the prior art process.

Adding to the complexity is that newer Fabs that control 300 mm wafers are now run overall by an Automatic Machine Handling System (AMHS) that effectively interfaces with the dispatching system. When dispatching no longer is correct from the coded rules, the AMHS does not know it and causes utilization to fall by overstocking or no stocking at tools or by sending a FOUP on a longer path to its next tool. FIG. 2 is a flow diagram that illustrates this problem. The AMHS 202 contains the FOUP Schedule, the Dispatcher, and other AMHS applications. The AMHS controls the operations on the Fab Floor 204. Tool group A is a set of tools 1A and 2A that perform the same process. Similarly, tool group B has tools 1B, 2B, and 3B, and tool group C has tools 1C and 2C. Transportation of FOUP is via transport system paths 208 that frequently are automatic overhead movers.

If the FOUP Schedule 209 is developed to use tools 1A, 2B, and 2C, and tool 2B goes off line while the FOUP is being operated on by tool IA, it is up to the Dispatcher 210 to correct the processing to another tool. As work continually is added to the Fab, the Dispatcher can be overwhelmed and work can start building up at tools 1B and 3B. If additionally tool 1C goes off line and 2B comes back online, the Dispatcher 210 must again try to correct the situation. Without current input into the Dispatcher, delays and overstocking can result before the FOUP is Done 212 with its processing. Transport condition, dynamic constraints, and special conditions are not easily factored in under the current process.

Thus, a new method and system is needed to prevent these problems of scheduling and dispatching of the FOUP's. This invention provides this solution and other advantages.

Figure 3:
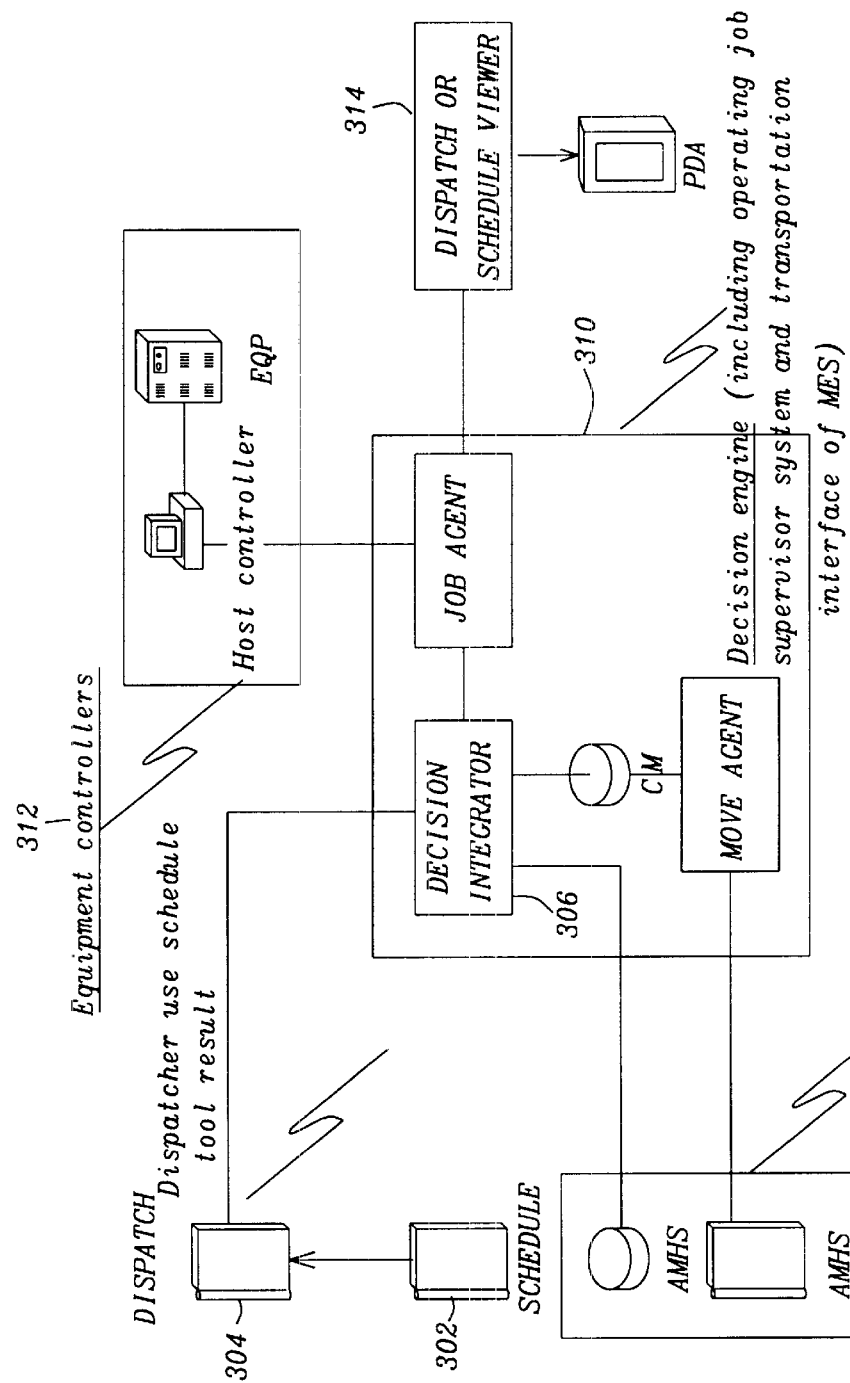
FIG. 3 is a block diagram of the new system architecture.

The new method provides a rule-based software decision engine called the Operation Job Supervisor system (OJS) to supervise optimal throughput of product into processing equipment. This decision engine integrates with other Fab systems (such as AMHS and MES (Manufacturing Equipment System) and a cooperative model between dispatch and schedule functions that provides consistency. FIG. 3 shows a block diagram of the systems architecture. The Schedule 302 tool gives input to the Dispatch 304 tool. The Dispatch tool is now integrated with the Decision Engine 310 through a Decision Integrator 306 which also integrates with the AMHS. This is the same AMHS that in the prior art included the material handling system and its hardware. The Decision engine 310 includes the Operation Job Supervisor system and the transportation interface of the MES, the Move Agent, the CIM (Computer Integrated Manufacturing) database, and the Job Agent. The Job Agent communicates with the Equipment Controllers 312 at each individual tool's host controller. As an added control feature, a Dispatch or Schedule Viewer 314 is available to check operations in realtime on a networked PDA or other device.

Looking at the OJS system in detail, it handles three functions for control of the FOUP. These functions are equipment asking FOUP or wafer box to move in (MIR), equipment asking FOUP or wafer box to move out (MOR), and having FOUP or wafer box go into stocker (Stock-in). The equipment host program executes calls to the decision engine when FOUP is transporting or static and the equipment host program asks the decision engine to adjust decision (Re-MIR).

The OJS is a fully automated decision engine that is integrated with the schedule and dispatch systems. Every MIR command will use dispatch results, and every MOR command will use schedule results. These commands are issued by the actual equipment host program of the tools being used. Thus, schedule and dispatch systems are now integrated with the tools. When a FOUP process is completed, MOR is called to get the next equipment and a call is made to the equipment's MIR. This tool-to-tool transportation will include schedule results (by MOR) and dispatch results (by MIR). The OJS monitors these commands and transport. With this information it can detect and avoid stocker traffic jams and optimize stocker crane utilization. The OJS can use dispatch and schedule results to support overhead external buffers (OHB), stockers, and special storage. It can pre-fetch FOUP's into the stocker or send them to the OHB directly.

The scheduling function determines the next suitable equipment for a FOUP by a schedule system algorithm and has an added function of calculating a transportation cost table to arrive at routing costs. The dispatch system will decide which sorted Work In Progress (WIP) should next be processed using the transportation cost table from the schedule function and determine the next suitable equipment for a FOUP to achieve maximum benefit using the schedule result.

Additionally, this new method and system combines the dispatch rules with dispatch or scheduling system by a registration and reservation technique. For registration, the OJS delivers the information (ex. lot destination and priority) and current AMHS status to the dispatch system. For reservation, the dispatch system should follow the information that OJS delivers to meet its own optimal criteria but can change it according to the newest situation or special condition. For example, when an equipment A's host port program asks for a MIR (request to load a FOUP as it is currently empty) the MIR calls the dispatch system to get next FOUP from a WIP sorted list. If the schedule system had chosen FOUP B as the next candidate for equipment A, the OJS will pass this information to the dispatch system by registering FOUP B to equipment A. The dispatch system can accept this result or change this decision by looking at the current situation.

A central decision evaluation formula is a core part of the OJS decision engine. Its purpose is to minimize costs. It is a dynamically calculated formula that eventually provides the decision in engine with information from system analysis tools including schedule and dispatching to make an optimal decision on transport. The value "Formula" that results is a number calculated by using values obtained from several real-time automated systems that are normalized by using predefined parameter constants. These constants have been chosen by trial and error to insure that each value is weighted properly and corrects for unit differences. This formula value is calculated for each lot and its relative value is the bases for determining which lot has the highest priority. A simple table with the calculated values for each lot sorted highest to lowest is all that is needed to make the decision on which lot to transport. The lowest calculated value being the highest priority lot, and the first to be dispatched. The next lowest is in turn chosen, keeping in mind that the values are recalculated in real time so that priorities are adjusted as changes are introduced to the manufacturing operation. The formula is:

$$\text{Formula} = c_1 * S + c_2 * D + c_3 * T + c_4 * C + c_5$$

Where:

S is the scheduling system evaluation result for each equipment.

D is the dispatch system evaluation result for each equipment.

T is the distance to each equipment compared to current position for calculating transportation costs.

C is the operational or reset cost. If FOUP is transferring, C is equal to 1. Otherwise it is zero. $c_1$, $c_2$, $c_3$, $c_4$, $c_5$ are parameter constants.

A dynamic sub-formula that can consider transport condition, constraint issues, and special conditions is given below. Again, as before, the resultant value "D" is a number calculated by using values obtained from several real-time automated systems that are normalized by using predefined parameter constants. These constants have been chosen by trial and error to insure that each value is weighted properly, and corrects for unit differences. This formula value is calculated for each lot as before and its relative value is the bases for determining which lot has the highest priority. A simple table with the calculated values for each lot sorted highest to lowest is again all that is needed to make the decision on which lot to transport. The lowest calculated value being the highest priority lot, and the first to be dispatched. The next lowest is in turn chosen, and values are recalculated in real time so that priorities are adjusted as changes are introduced to the manufacturing operation.

$$D = c_1 * P + c_2 * Q + c_3 * M + c_4 * R + c_5 * O$$

where:

P is the lot priority in the Material Engineering System (MES).

Q is the current time divided by the queue time limit or zero.

M is return this area value if this batch is in maximum batch size.

R is the related resource availability like the reticle or monitor lot.

O is the other constraints such as an MES or special condition manufacturing constraint.

$c_1$, $c_2$, $c_3$, $c_4$, $c_5$ are constants.

The integration of the dispatch and schedule systems and the decision engine in combination with these decision evaluation formulas allows for dynamic, self-adjusting throughput. An automatic learning methodology learns patterns automatically from these formulas in a fashion similar to artificial intelligence when variables are changed to control condition and parameters are changed to control weight for maximum wafers per hour (WPH). Information dynamically transported to the decision engine is a learning source.

Figure 4:
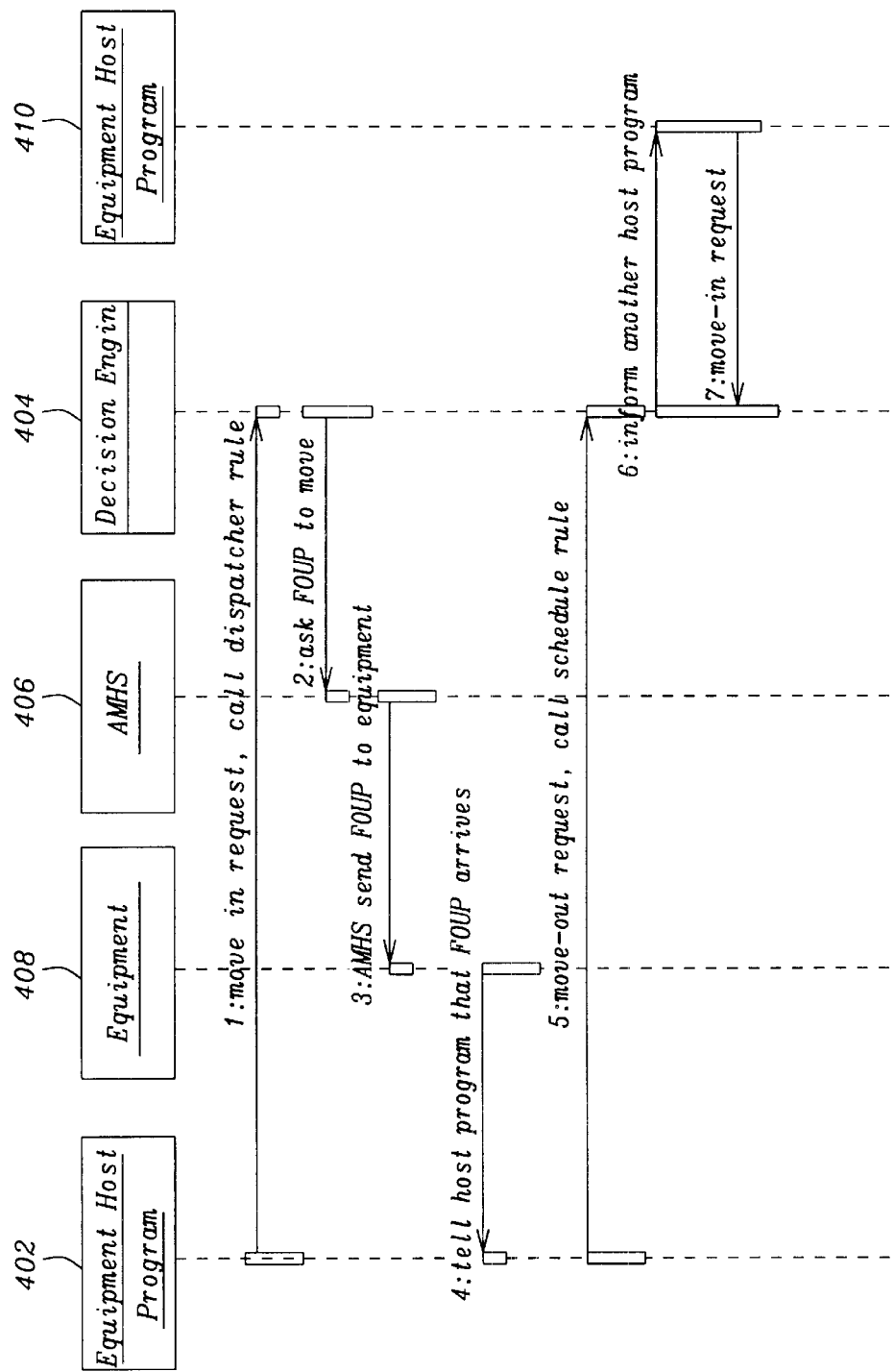
FIG. 4 is a flow diagram showing the relationship between the OJS, equipment, and AMHS in full-automation processing.

FIG. 4 is a flow diagram that shows the relationship between the OJS, equipment hosts, and the AMHS in full automation processing. The first operation shown is that the Equipment Host Program 402 with its tool currently empty issues a MR move-in request calling the dispatch rules to the Decision Engine (OJS, MES) 404. The Decision Engine, based on the formula, scheduling and dispatcher rules, chooses the best FOUP and asks FOUP to move by sending a request to the AMHS 406. The AMHS then sends FOUP to Equipment 408. The Equipment tells the host program when the FOUP arrives. When processing is done by the Equipment, the Equipment Host Program 402 sends a MOR move-out request calling the scheduling rules to the Decision Engine 404 which uses the scheduling rules to help choose the next tool. The Decision Engine then informs another Equipment Host Program 410 that there is a FOUP to be processed. That Equipment Host Program then issues the MIR move-in request and the sequence is started again.

Figure 5:
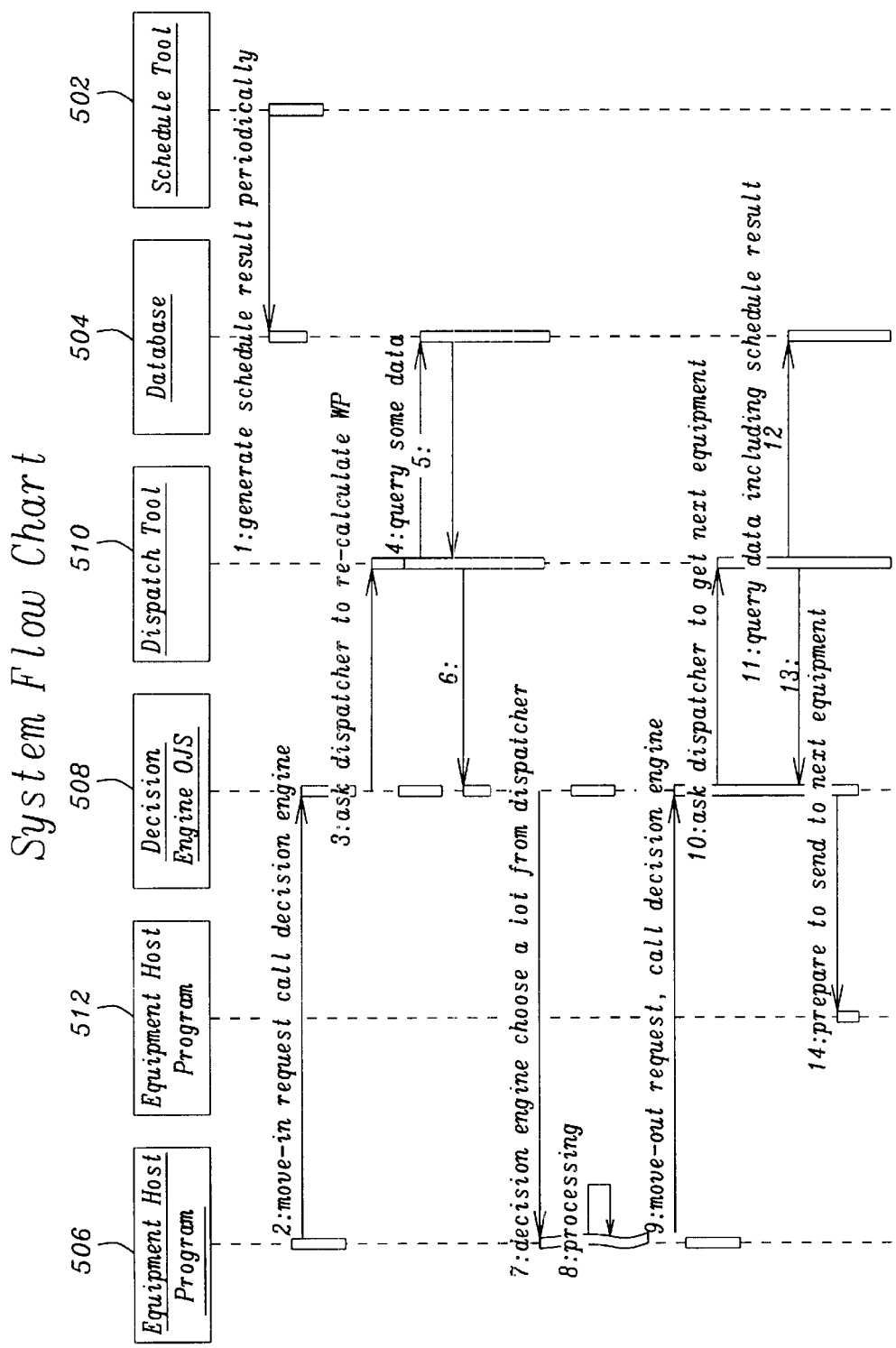
FIG. 5 a flow diagram of the method of the system.

The new method can be seen by looking at the system flow diagram of FIG. 5. The output of the Schedule Tool 502 generates schedule results periodically and places them in the Database 504. The Equipment Host Program 506 issues a MIR move-in request call to the Decision Engine 508. The Decision Engine asks the Dispatcher Tool 510 to re-calculate WIP. Scheduling data is retrieved from the Database 504 and the Dispatcher Tool 510 passes its decision derived using the formulas back to the Decision Engine 508. From that information the Decision Engine chooses a lot from the dispatcher and informs the Equipment Host Program 506. The FOUP is moved to that equipment and processing begins. When processing is completed, the Equipment Host Program issues a MOR move-out request to the Decision Engine 508. The Decision Engine asks the Dispatcher Tool 510 to get next equipment. The Dispatcher Tool queries data including schedule results that are now more current from Database 504. The Dispatcher Tool sends its decision back to the Decision Engine 508 and the next Equipment Host Program 512 is notified and the FOUP is prepared to be sent to the next equipment.

The method of the invention provides advantages over the prior art including that the system provides full automation and will dynamically learn to choose the optimum path to directly transfer the FOUP for its next processing to maximize throughput and reduce cost with less human involvement, the system architecture is easier to maintain, and the integration of dispatch and schedule functions results in greater ability and a more consistent and less fuzzy result. Furthermore, central evaluation formulas dynamically collect information from system analysis tools for improved transport decisions for a reduction of transport time and costs, and operation costs are reduced by considering dynamic constraints and special conditions.

While the invention has been particularly shown and described with reference to preferred embodiments thereof, it will be understood by those skilled in the art that various changes in form and details may be made without departing from the spirit and scope of the invention.

What is claimed is:

1. An integrated method for automated Fab production decision support, comprising:
   a. providing a software decision engine to supervise optimal throughput of product into processing equipment;
   b. providing for said decision engine to be rule based;
   c. defining an cooperative model integration between the dispatch and schedule functions to integrate with said decision engine;
   d. integrating said decision engine system with other Fab systems to interact as unified whole system;
   e. providing for decision evaluation formula to integrate results of system analysis tools for said production decision support for the self-adjusting of product throughput between the scheduling and dispatching systems;
   f. providing for sub-formula of said decision evaluation formula to resolve dynamic constraint issues between the scheduling and dispatching systems, and
   g. providing for automatic learning methodology in said system.

2. The integrated method for automated Fab production decision support of claim 1, wherein said decision engine handles the three functions of equipment asking a wafer box to move in, equipment asking said wafer box to move out, and said wafer box going into stocker.

3. The integrated method for automated Fab production decision support of claim 2, wherein a equipment host program executes calls to the decision engine.

4. The integrated method for automated Fab production decision support of claim 3, wherein when the wafer box is transporting or static, so a equipment host program asks said decision engine to adjust decision.

5. The integrated method for automated Fab production decision support of claim 1, wherein the rule-based decision engine provides for ongoing rule revision without need for recompiling and system shut down.

6. The integrated method for Fab automated production decision support of claim 1, wherein the integration of said dispatch and schedule functions and said decision engine provides consistency for said product decision support.

7. The integrated method for Fab automated production decision support of claim 6, wherein said integration of said dispatch and schedule functions and said decision engine in combination with said decision evaluation formulas allows for dynamic, self-adjusting said throughput.

8. The integrated method for Fab automated production decision support of claim 1, wherein said schedule function will calculate a transportation cost table to show routing cost.

9. The integrated method for Fab automated production decision support of claim 8, wherein said schedule function determines the next suitable equipment for said wafer box by a schedule system algorithm.

10. The integrated method for Fab automated production decision support of claim 1, wherein said dispatch function will decide which sorted work in progress should next be processed using said transportation cost table from said schedule function.

11. The integrated method for Fab automated production decision support of claim 10, wherein said dispatch function determines the next suitable equipment for a wafer box to achieve maximum benefit using a schedule result.

12. The integrated method for Fab automated production decision support of claim 1, wherein said decision evaluation formula provides dynamic information for making decisions integrating the scheduling and dispatching systems.

13. The integrated method for Fab automated production decision support of claim 12, wherein said formula provides said decision engine with information from the schedule and dispatching system to make an optimal decision on transport.

14. The integrated method for Fab automated production decision support of claim 13, wherein a sub-formula is defined integrating the scheduling and dispatching systems.

15. The integrated method for Fab automated production decision support of claim 14, wherein the dynamic sub-formula can consider transport condition, constraint issues, and special conditions.

16. The integrated method for Fab automated production decision support of claim 1, wherein said automatic learning methodology will learn patterns automatically in a fashion similar to artificial intelligence when variables are changed to control condition and parameters are changed to control weight for maximum wafers per hour.

17. The integrated method for Fab automated production decision support of claim, 16 wherein information dynamically transported to said decision engine is a learning source.

18. An integrated system for automated Fab production decision support, comprising:
   a. a means to provide a software decision engine to supervise optimal throughput of product into processing equipment;
   b. a means to provide said decision engine to be rule based;
   c. a means to define an integration between the dispatch and schedule functions to integrate with said decision engine;
   d. a means to integrate said decision engine system with other Fab systems to interact as unified whole system;
   e. a means to provide a decision evaluation formula to integrate results of system analysis tools for said production decision support for the self-adjusting of product throughput between the scheduling and dispatching systems;
   f. a means to provide a sub-formula of said decision evaluation formula to resolve dynamic constraint issues between the scheduling and dispatching systems, and
   g. a means to provide for an automatic learning methodology in said system.

19. The integrated system for automated Fab production decision support of claim 18, wherein said decision engine handles the three functions of equipment asking a wafer box to move in, equipment asking said wafer box to move out, and said wafer box going into stocker.

20. The integrated system for automated Fab production decision support of claim 19, wherein a equipment host program executes calls to the decision engine.

21. The integrated system for automated Fab production decision support of claim 20, wherein when the wafer box is transporting or static, so a equipment host program asks said decision engine to adjust decision.

22. The integrated system for automated Fab production decision support of claim 18, wherein the rule-based decision engine provides for ongoing rule revision without need for recompiling and system shut down.

23. The integrated system for Fab automated production decision support of claim 18, wherein the integration of said dispatch and schedule functions and said decision engine provides consistency for said product decision support.

24. The integrated system for Fab automated production decision support of claim 23, wherein said integration of said dispatch and schedule functions and said decision engine in combination with said decision evaluation formulas allows for dynamic, self-adjusting said throughput.

25. The integrated system for Fab automated production decision support of claim 18, wherein said schedule function will calculate a transportation cost table to show routing cost.

26. The integrated system for Fab automated production decision support of claim 25, wherein said schedule function determines the next suitable equipment for said wafer box by a schedule system algorithm.

27. The integrated system for Fab automated production decision support of claim 18, wherein said dispatch function will decide which sorted work in progress should next be processed using said transportation cost table from said schedule function.

28. The integrated system for Fab automated production decision support of claim 27, wherein said dispatch function determines the next suitable equipment for a wafer box to achieve maximum benefit using a schedule result.

29. The integrated system for Fab automated production decision support of claim 18, wherein said decision evaluation formula provides dynamic information for making decisions:

$$formula = c_1*S + c_2*D + c_3*T + c_4*C + c_5$$

where:

S is the scheduling system evaluation result for each equipment,

D is the dispatch system evaluation result for each equipment,

T is the distance to each equipment compared to current position for calculating transportation costs, C is the operational or reset cost, if wafer box is transferring, C is equal to 1, otherwise it is zero, and $c_1, c_2, c_3, c_4, c_5$ are parameter constants.

30. The integrated system for Fab automated production decision support of claim 29, wherein said formula provides said decision engine with information from the schedule and dispatching system to make an optimal decision on transport.

31. The integrated system for Fab automated production decision support of claim 30, wherein a sub-formula is defined of:

$$D = c_1*P + c_2*Q + c_3*M + c_4*R + c_5*O$$

where:

P is the lot priority in the material engineering system,

Q is the current time divided by the queue time limit or zero,

M is return this area value if this batch is in maximum batch size,

R is the related resource availability like the reticle or monitor lot,

O is other constraints such as a material engineering system or special condition manufacturing constraint, $c_1, c_2, c_3, c_4, c_5$ are constants.

32. The integrated system for Fab automated production decision support of claim 31, wherein the dynamic sub-formula can consider transport condition, constraint issues, and special conditions.

33. The integrated system for Fab automated production decision support of claim 18, wherein said automatic learning methodology will learn patterns automatically in a fashion similar to artificial intelligence when variables are changed to control condition and parameters are changed to control weight for maximum wafers per hour.

34. The integrated system for Fab automated production decision support of claim, 33 wherein information dynamically transported to said decision engine is a learning source.

* * * * *